United States Patent [19]

Shikata

[11] Patent Number: 4,606,248
[45] Date of Patent: Aug. 19, 1986

[54] CUTTING TOOL

[75] Inventor: Hiroshi Shikata, Yokohama, Japan

[73] Assignee: Tokyo Shibaura Denki Kabushiki Kaisha, Kawasaki, Japan

[21] Appl. No.: 691,735

[22] Filed: Jan. 16, 1985

Related U.S. Application Data

[63] Continuation of Ser. No. 422,098, Sep. 23, 1982, abandoned.

[30] Foreign Application Priority Data

Dec. 18, 1981 [JP] Japan .................. 56-205019

[51] Int. Cl.⁴ .................. B23B 1/00; B23B 27/14
[52] U.S. Cl. .................. 82/1 C; 76/101 R; 407/114
[58] Field of Search .................. 76/101 R, 101 A; 407/114, 115, 116, 7; 82/1 C

[56] References Cited

U.S. PATENT DOCUMENTS

| | | | |
|---|---|---|---|
| 3,557,416 | 1/1971 | Jones | 407/114 |
| 3,751,782 | 8/1973 | Fruish | 407/114 |
| 3,968,550 | 7/1976 | Gehri | 407/114 |
| 4,087,192 | 5/1978 | Hertel | 407/114 |
| 4,214,845 | 7/1980 | Mori | 407/114 |
| 4,259,033 | 3/1981 | McCreery et al. | 407/114 |
| 4,315,706 | 2/1982 | Erkfritz | 407/101 |
| 4,507,023 | 3/1985 | Shikata | 407/105 |

FOREIGN PATENT DOCUMENTS

| | | | |
|---|---|---|---|
| 2241167 | 3/1974 | Fed. Rep. of Germany | 407/114 |
| 2357180 | 5/1975 | Fed. Rep. of Germany | 407/114 |
| 166 | of 1868 | United Kingdom | 407/7 |

Primary Examiner—Francis S. Husar
Assistant Examiner—Jerry Kearns
Attorney, Agent, or Firm—Oblon, Fisher, Spivak, McClelland & Maier

[57] ABSTRACT

A cutting tool comprises a bit-holder fed at a prescribed feed amount f per revolution in a feeding direction and a throw-away tip made of superhard metal and including a rake face, an bottom face parallel to the rake face, and cutting blade edges. The throw-away tip is provided with recess on at least one of the rake and bottom faces thereof. A distance w3 between a side surface defining the recess and the cutting blade edge in the feeding direction is defined within a range satisfying the following formula represented by; $f \leq w3 \leq 5f$. Therefore rare and expensive cutter material can be saved, and the throw-away tip can be prevented from being damaged by cutting heat because its radiating area is made larger.

32 Claims, 52 Drawing Figures

F I G. 43
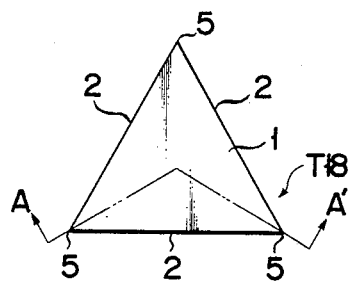
F I G. 44
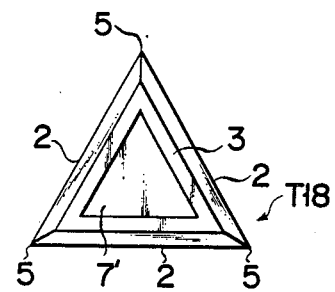
F I G. 45
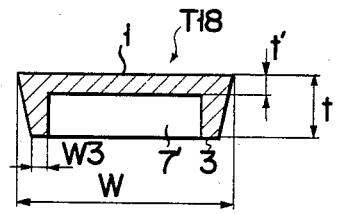
F I G. 46
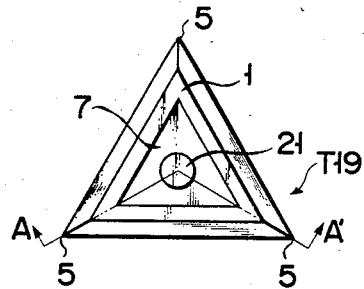
F I G. 47
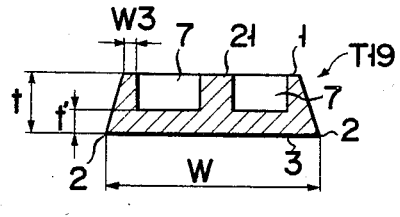

F I G. 48
F I G. 49
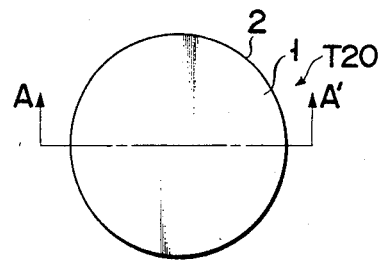
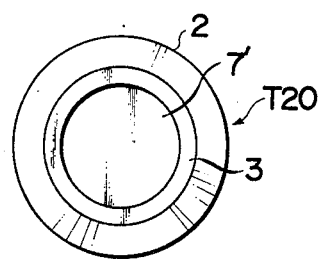
F I G. 50
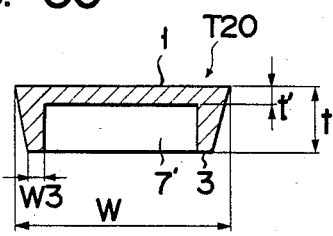
F I G. 51
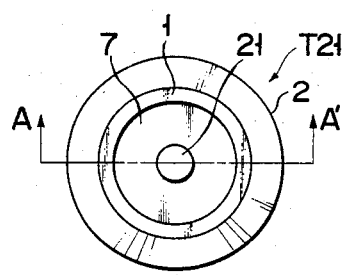
F I G. 52
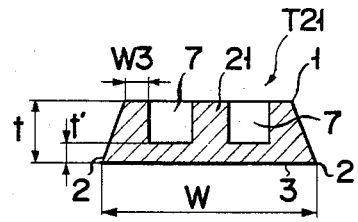

CUTTING TOOL

This application is a continuation of application Ser. No. 422,098, filed Sept. 23, 1982 and now abandoned.

BACKGROUND OF THE INVENTION

The present invention relates to a cutting tool having a throw-away tip and, more particularly, a cutting tool of resource-saving type.

A cutting tool used as a blade provided with cutting blade edge and a shank serving as its holder. The blade comprises to solder a cutter material to the shank, or detachably attaching a piece of cutter material or pressedly attaching it by means of a clamping member to the end of the shank. The piece of cutter material is called throw-away tip. With the cutting tool provided with the throw-away tip, the throw-away tip is not re-ground but replaced by a new one when its cutting blade edge is worn. The throw-away tips are grouped to these each having a fixing through-hole penetrating through from its rake face to its bottom face at a central portion thereof, and to those each having no such through-hole. The throw-away tip having the fixing through-hole is detachably attached to the end of the shank of the cutting tool by means of a clamping pin, which is inserted into the fixing through-hole, while the other throw-away tip having no such through-hole is pressedly fixed to the end of the shank by means of the clamping member.

These throw-away tips are made of rare and expensive cutter material. When its cutting blade edge is worn or broken, the throw-away tip is thrown away because it can not be re-ground. Therefore, conventional cutting tools with throw away tips were not economical and caused a problem in the aspect of using resources. In addition, extremely high cutting heat was generated in the throw-away tip at the time of cutting process, thus causing the throw-away tip to sometimes be heat-broken as its cutting process was advanced. Conventional throw-away tips, however, were not provided with any means efficient to radiate this high cutting heat.

SUMMARY OF THE INVENTION

The present invention is intended to eliminate the above-mentioned drawbacks and its object is therefore to provide a cutting tool having a throw-away tip and capable of reducing rare and expensive cutter material used and suppressing the opportunity of its throw-away tip being broken because of cutting heat.

A cutting tool according to the present invention is provided with a throw-away tip having at least plural either of through-holes and recesses formed in its rake and bottom faces to reduce expensive cutter material used and increase its area for radiating the cutting heat.

BRIEF DESCRIPTION OF THE DRAWINGS

FIGS. 43, 44 and 45 are top, bottom and seolional views showing an eighteenth embodiment of a cutting tool according to the present invention, respectively;

FIGS. 46 and 47 are top plan and sectional views showing a nineteenth embodiment of a cutting tool according to the present invention, respectively;

FIGS. 48, 49 and 50 are top, bottom and sectional views showing a twentieth embodiment of a cutting tool according to the present invention, respectively; and FIGS. 51 and 52 are top plan and sectional views showing a twenty first embodiment of a cutting tool according to the present invention, respectively.

DETAILED DESCRIPTION OF THE PREFERRED EMBODIMENTS

Various embodiments of cutting tools according to the present invention will be described in detail referring to the accompanying drawings.

Figure 1:
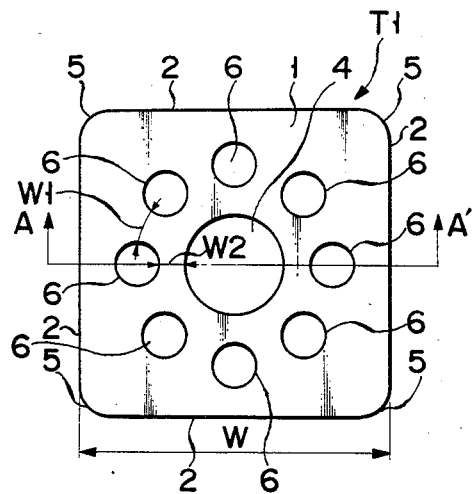
FIG. 1 is a top plan view showing a first embodiment of a cutting tool according to the present invention.
Figure 2:
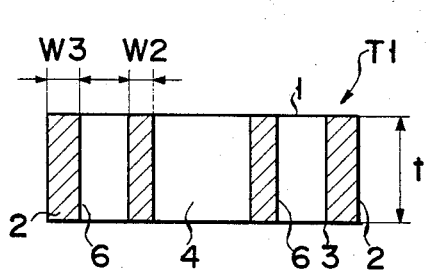
FIG. 2 is a sectional view taken along a line A—A' in FIG. 1.

FIG. 1 is a top plan view showing a first embodiment of a throw-away tip according to the present invention, and FIG. 2 is a sectional view taken along a line A—A' in FIG. 1. The first embodiment of throw-away tip T1 shown in FIGS. 1 and 2 is a square with (W) wide and (t) thick. The throw-away tip T1 has a rake face 1 formed on its upper surface, chips cut out of a work piece striking and sliding on the rake face 1. The throw-away tip T1 also has cutting blade edges 2 formed along the circumference of the rake face 1. The throw-away away tip T1 also has a bottom face 3 formed opposite to its upper surface and being in contact with a cutting tool. A fixing through-hole 4 is formed in the center of the throw-away tip T1, passing through its and bottom faces 1 and 3. A clamping pin (not shown) is inserted through the fixing through-hole 4 to attach and fix the throw-away tip T1 to the bit in such a way that the bottom face 3 of the throw-away tip T1 comes in contact with a face of the cutting tool.

Numeral 5 represents a nose of each cutting blade edge 2. Around the fixing through-hole 4 are formed a plurality of through-holes 6 (eight with this embodiment). Adjacent through-holes 6 have a distance (w1) interposed between them, and they pass through the rake and bottom faces 1 and 3 of the throw-away tip T1. Wall faces of each of the through-holes 6 and fixing through-hole 4 are separated from each other to have a distance (w2) between them. Wall face of each of through-holes 6 which are located nearest to their corresponding cutting blade edges 2, respectively, is separated from that of its corresponding cutting blade edge 2 to have a distance (w3) interposed between them.

Figure 3:
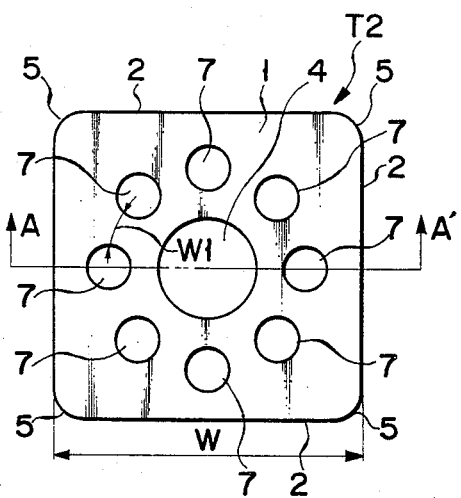
FIGS. 3 and 4 are top plan and sectional views showing a second embodiment of a cutting tool according to the present invention, respectively.
Figure 4:
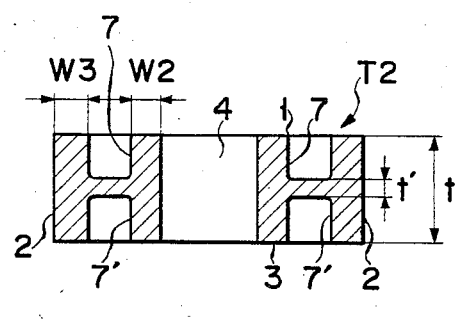

FIGS. 3 and 4 show a second embodiment of throw-away tip T2 according to the present invention, in which FIG. 3 is a top view while FIG. 4 a sectional view taken along a line A—A' in FIG. 3. Same parts of the throw-away tip T2 as those of the throw-away tip T1 are represented by same numerals, and description on these parts will be omitted. The second embodiment of throw-away tip T2 is different from the first embodiment in that a plurality of recesses 7 and 7' (eight, every set of recesses, with this embodiment) are formed around the fixing through-hole 4 in both rake and bottom faces 1 and 3, respectively. Each of recesses 7 in the rake face 1 is separated from each of recesses 7' in the bottom face 3 to have a thickness (t') between them in this case.

When the bit with the throw-away tip T1 or T2 attached is used to cut a work piece, the rake and bottom faces 1 and 3 and cutting blade edges 2 are subjected to large stress. It is feared that the through-holes 6, recesses 7 and 7', which were not provided in conventional throw-away tips, serve to weaken the strength of the throw-away tip against the stress. It can not be weakened, however, when the through-holes 6, recesses 7 and 7' are formed to have their distances (w1, w2 and w3) and thickness (t') selected appropriately.

The reason why the strength of the throw-away tip is not weakened will be described. It is important in the case of the bit with the throw-away tip T1 or T2 attached to know what part of cutting blade edge 2 is subjected to the stress and how large the stress is at the time of cutting process and what extent of the rake face 1 is in contact with chips cut out of the work piece when the cutting tool carries out its cutting process at a predetermined feeding speed f. Therefore, a tool-chip contact length l on the rake face 1 when the cutting process is carried out by a cutting tool with the conventional throw-away tip attached will be described referring to FIG. 5.

Figure 5:
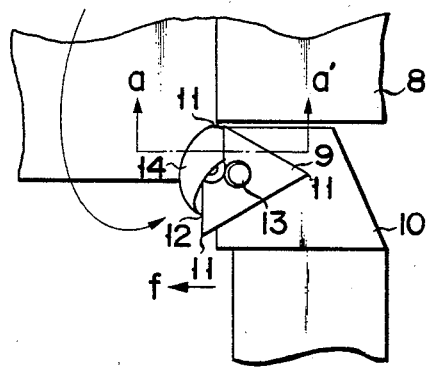
FIGS. 5 to 10 are views for explaining the dimensions of a cutting tool according to the present invention.
Figure 6:
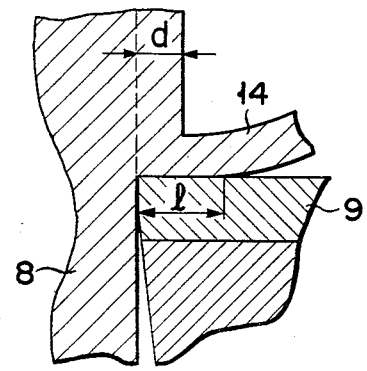

FIG. 5 shows a condition under with the outer circumference of a cylindrical work piece 8, for example, is being cut by a cutting tool 10 provided with a triangular throw-away tip 9, for example. It is assumed that crosscutting angle (not shown) is set zero and that a nose 11 is also set near zero so as to approximate to two dimensional cutting. Reference numeral 12 represents a cutting blade edge. FIG. 6 is a sectional view taken along a line a—a' in FIG. 5. The length of frictional trace left by a cut chip 14 on a rake face of the throw-away tip 9 under the above-mentioned conditions is measured by a tool microscope. The tool-chip contact length l can be obtained from the length of the frictional trace left by the cut chip 14. When the ratio l/d of tool-chip contact length l and depth of cut d is checked, it has been found to range from approximately 3 to 5. Particularly when cutting fluid is used, it has been 2.7. Same parts shown in FIGS. 6 through 10 and having same functions as those in FIG. 5 are represented by same numerals and description on these parts will be omitted.

Figure 7:
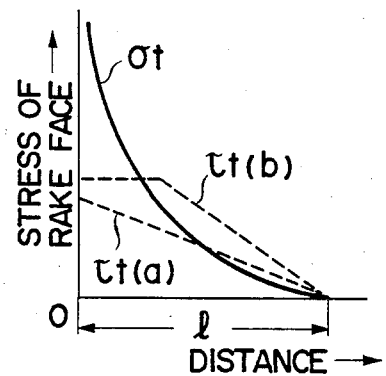

The stress acting on the rake face of the throw-away tip will be described referring to FIG. 7, which shows a characteristic diagram in which the stress was measured at every area on the rake face. According to the characteristic diagram shown in FIG. 7, vertical stress ($\sigma t$) acting on the rake face 13 vertically increases exponentially and functionally as coming nearer to the cutting blade edge 12 and vanishes at a point (or cut chip contact limit) remote from the cutting blade edge 12 by the tool-chip contact length l. On the contrary, frictional stress ($\tau t$) acting horizontally on the rake face 13 shows triangular or trapezoidal distribution ($\tau t(a)$ or $\tau t(b)$) and vanishes at the point (or cut chip contact limit) remote from the cutting blade edge 12 by the tool-chip contact length l.

Figure 8:
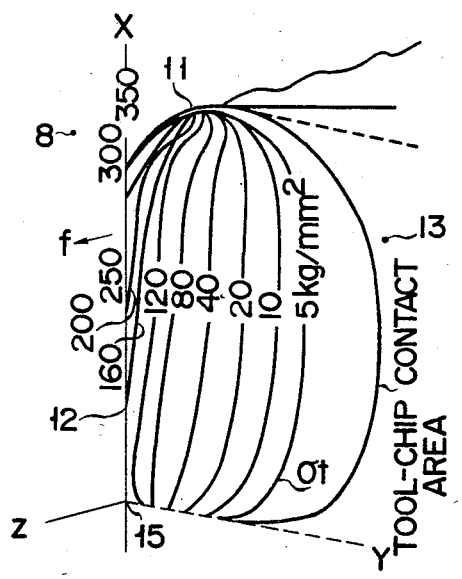

FIG. 8 is an equal stress diagram for explaining rake face vertical stress $\sigma t$ distribution which is actually measured in the three-dimensional cutting. Stress abruptly increases from the tool-chip contact boundary to the cutting edge. Similarly, stress increases from the cutting end to the nose. Crater wear occurs when the tool chips pass on the rake face under friction. The area for tool wear is apparently limited to the range of the tool-chip contact length D. According to the characteristic diagram shown in FIG. 8, vertical stress ($\sigma t$) increases quickly as coming nearer to the cutting blade edge 12 from the point (or cut chip contact limit), which is separated from the cutting blade edge 12 of the rake face 13 by the tool-chip contact length l, and also increases as coming nearer from the cutting end 15 of the cutting blade edge 12 to the nose 11 thereof. Friction on the rake face 13 of the throw-away tip is caused by the cut chip 14 frictionally sliding on the rake face 13. The area where this friction is caused is within the tool-chip contact length measured from the cutting blade edge 12.

Figure 9:
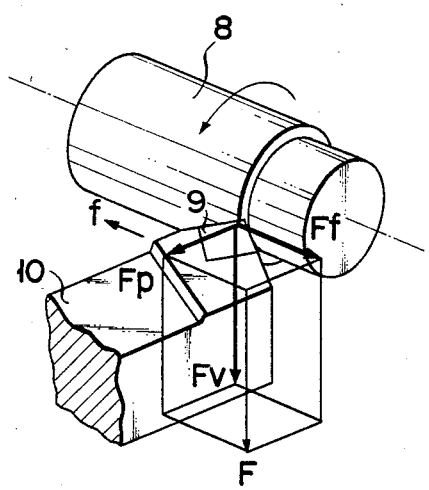

Cutting resistance appearing under three dimensional cutting will be described referring to FIG. 9, which is a view for explaining the cutting resistance under three dimensional cutting. Cutting resistance F between the throw-away tip 9 of the cutting tool 10 and the work piece 8 to be cut includes the largest vertical component force $F_v$ acting on the throw-away tip 9 vertically downward (thicknesswise). This vertical component force $F_v$ is a main component force of cutting resistance F, whose main component is vertical stress ($\sigma t$) acting on the rake face 13, and larger than both of feeding component force $F_f$ of cutting resistance F in the axial direction of the work piece 8 and back component force $F_p$ of the cutting tool 10 in the longitudinal direction thereof.

Figure 10:
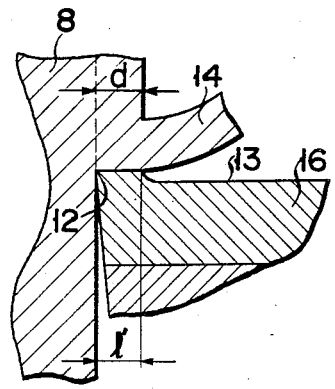

Cutting process carried out by a cutting tool which is intended to limit the tool-chip contact length l will be described referring to FIG. 10, which is a schematic view showing cutting process achieved by a cut chip contact area limiting tool for limiting the tool-chip contact length l to l' (l'<l). The blade of the cut chip contact area limiting tool 16 is formed thicker by the distance l' measured from the cutting blade edge 12. Therefore, cutting resistance F can be reduced as compared with usual cutting tools which provide the tool-chip contact length l, thus reducing the wear of the cutting tool, especially the rake face and keeping the life of blade long.

The above can be summarized as follows:

(A) The tool-chip contact length l on the rake face 13 is within about 5 times the depth of cut d.

(B) vertical stress ($\sigma t$) acting on various points of the rake face 13 becomes larger exponentially and functionally as coming nearer to the cutting blade edge 12, and also becomes larger in the edge direction of the cutting blade edge 12 as coming from the cutting end 15 to the nose 11.

(C) Vertical component force $F_v$ acting on the blade vertically downward (or the thicknesswise) is extremely larger than other component forces of cutting resistance F.

(D) The cut chip contact area limiting tool 16 for limiting the tool-chip contact length l enables cutting resistance F to be reduced and the wear of the rake face 13 to be suppressed, thus keeping the life of blade long.

Values of distances w1, w2 and w3 of through-holes 6 and thickness t' between recesses 7 and 7' of the throw-away tip T1 or T2 according to the present invention are determined on the basis of above-mentioned results. With the first and second embodiments shown in FIGS. 1 though 4, they are hardly broken under usual cutting condition if distance w3 is larger than the maximum value $f_{max}$ (measured in distance per revolution) ranging within the feeding amount f of cutting tool. Considering the function of vertical stress ($\sigma t$), it is a condition under which they are not broken thickness t is made large. Therefore, the upper limit value of this distance w3 is usually set $5 \times f_{max}$ which corresponds to the tool-chip contact length l. Distance w2 may be made equal to or smaller than distance w3. The reason for distance w2 will be detailed with reference to FIG. 11.

Figure 11:
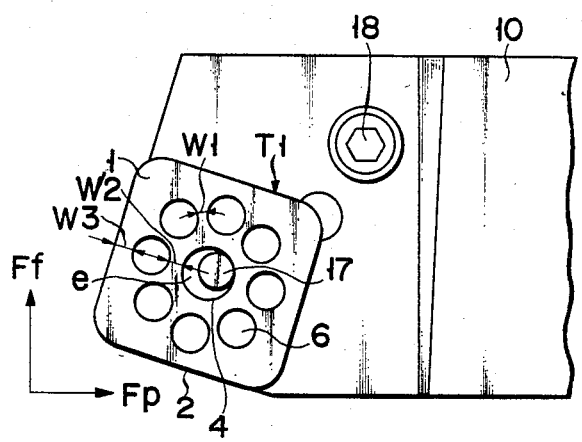
FIG. 11 is a top plan view showing the first embodiment of throw-away tip attached to the bit.

FIG. 11 shows the throw-away tip T1 attached to the bit. The throw-away tip T1 is attached to the cutting tool 10 by means of a clamping pin 17 inserted into its fixing through-hole 4. An eccentric clearance e is formed between the fixing through-hole 4 and the clamping 17 and the throw-awy tip T1 is fixed to the cutting tool 10 by turning a hexagon bolt 18, with its bottom face 3 partly contacted with the cutting tool 10. Since the eccentric clearance e exists in the direction in which cutting resistance F acts, therefore, cutting resistance F is not so large as that stress which acts on the cutting blade edge 12, thus allowing distance w2 to be set equal to or smaller than 5 $f_{max}$. Distance w1 may be same as distance w2 or w3. The reason is that material of which the throw-away tip is made is extremely excellent in compression strength.

The value of thickness t' between recesses 7 and 7' provided in both rake and bottom faces 1 and 3 will be explained taking the second embodiment of the present invention. It is preferable that thickness t' is set to a value larger than the maximum feeding amount $f_{max}$, and smaller than 5 times the maximum feeding amount $f_{max}$, or equal to a third of thickness t of throw-away tip. When thickness t' is made large in this case, cutting condition becomes better as compared with the throw-away tip having only through-holes 6.

It will be described in concrete how dimensions and other values of throw-away tip of the present invention are determined according to the above-mentioned results. When a throw-away tip having a square shape whose one side width W is 19.05 (mm) and also having a profile dimension whose thickness t is 6.35 (mm), for example, is used to cut a work piece of medium carbon steel (tensile strength: 60 kg/mm²), with its nose and cut-into amount set 1.6 (mm) and 5 (mm), respectively, distances w1, w2 and w3 will be shown. The feeding f of cutting tool is selected 0.4~0.8 (mm/revolution) in this case, and distance w3 becomes 0.8 (mm)<w3<5×0.8 (mm) since the maximum feeding $f_{max}$ is 0.8 (mm), and is usually selected 3.0 (mm). Similarly, distances w1, w2 and thickness t' are set within the ranges described above. Values thus determined are shown in the following Table.

TABLE

| Profile dimensions of throw-away tip | | | | | Value examples of throw-away tip (mm) | |
| --- | --- | --- | --- | --- | --- | --- |
| Thickness (t) | Whole width (W) | Diameter of fixing through-hole | Nose radius | Range of feeding f (mm/revol.) | Range of distance w3 $f_{max} <$ w3 $\leq 5f_{max}$ | Decision of W3 (w1, w2, t' being based on w3) |
| 3.18 | 9.525 | 4.0 | 0.8 | 0.2–0.5 | 0.5 < w ≦ 2.5 | 1.0 |
| 4.76 | 12.70 | 5.2 | 1.2 | 0.3–0.6 | 0.6 < w ≦ 3.0 | 2.0 |
| 6.35 | 19.05 | 8.0 | 1.6 | 0.4–0.8 | 0.8 < w ≦ 4.0 | 3.0 |
| 7.94 | 25.4 | 9.2 | 2.4 | 0.6–1.2 | 1.2 < w ≦ 6.0 | 4.0 |

According to the first or second embodiments of throw-away tip of the present invention as described above, the following effects can be achieved. Since through-holes 6 pass through from the rake face 1 to the bottom face 3 or recesses 7 and 7' are provided in both the rake and bottom faces 1 and 3, respectively, the throw-away tip T1 or T2 is increased in its surface area to enhance radiating effect and thus protected better from heat damage. This effect is effective when thickness t of the throw-away tip is set large to some extent. Radiating effect can be achieved best particularly when the inner circumferential area of through-holes 6 is larger than two times the sectional area of them. When cooling medium such as cutting fluid is used, this cooling medium flows into through-holes 6 or recesses 7 or 7' to more remarkably achieve radiating effect.

Since the cut chip in contact with the rake face 1 of the throw-away tip has a length smaller than 5 times the cut thickness d measured from the cutting blade edge 12, stress acting on the rake face 1 becomes larger as coming nearer to the cutting blade edge 12. Friction is caused on that part of the rake face 1 which is located within 5 times the depth of cut d measured from the cutting blade edge 12. Cutting resistance F includes vertical component force $F_v$ acting on the throw-away tip T1 or T2 vertically downward (or thicknesswise) and being extremely larger than other component forces. This teaches that most of the rake face 1 of the throw-away tip T1 or T2 has no relation to cutting process practically. Therefore, even if the value of each of distances w1, W2, w3 and thickness t' is set larger than the maximum feeding $f_{max}$ but smaller than 5 times the maximum feeding $f_{max}$, when the upper limit of the feeding f is selected $f_{max}$, to thereby form the through-holes 6 or recesses 7 and 7', rare and expensive cutter material can be saved without lowering cutting capacity.

The fixing through-hole 4 is quite same as conventional ones and therefore enables the throw-away tip T1 or T2 to be fixedly attached to the bit similarly to conventional cases. The throw-away tip T1 or T2 is fixed to the cutting tool 10 with its bottom face 3 contacted with the seat of the cutting tool 10. Since the throw-away tip T1 or T2 is provided with through-holes 6 or recesses 7 and 7' in its bottom face 3, that area of the bottom face 3 which is in contact with the seat of the cutting tool 10 is made small, thus allowing the throw-away tip T1 or T2 to be easily flatted and attached. Particularly when a mass of throw-away tips are polished to flat their rake and bottom faces 1 and 3, this processing efficiency can be enhanced because their area to be polished is small.

Other embodiments of throw-away tips according to the present invention will be described. Functions and parts of these other embodiments which correspond to those of the first and second embodiments shown in FIGS. 1 through 4 will be represented by same reference numerals and description on these functions and parts will be omitted.

Figure 12:
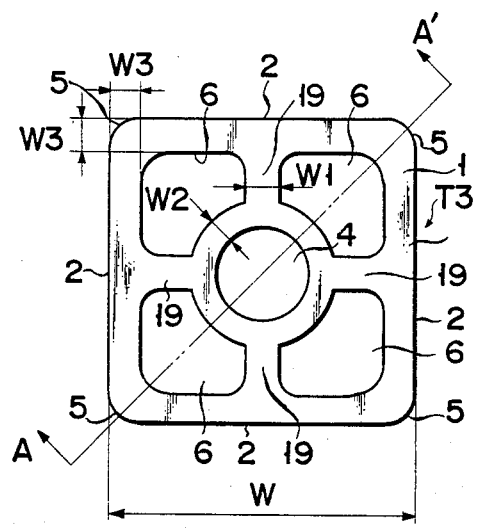
FIGS. 12 and 13 are top plan and sectional views showing a third embodiment of a cutting tool according to the present invention, respectively.
Figure 13:
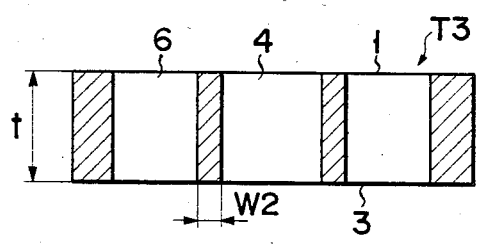

FIG. 12 is a top view showing a third embodiment of the present invention and FIG. 13 is a sectional view taken along a line A—A' in FIG. 12. This embodiment of throw-away tip T3 is of square shape and provided with four through-holes 6 arranged between the noses 5 and the fixing through-hole 4. A partition wall 19 of distance or width w1 is defined between the adjacent through-holes 6.

Figure 14:
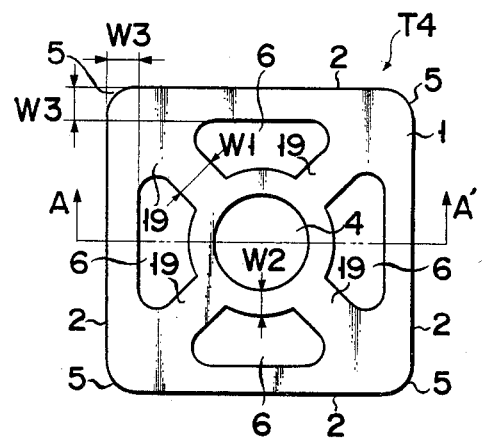
FIGS. 14 and 15 are top plan and sectional views showing a fourth embodiment of a cutting tool according to the present invention, respectively.
Figure 15:
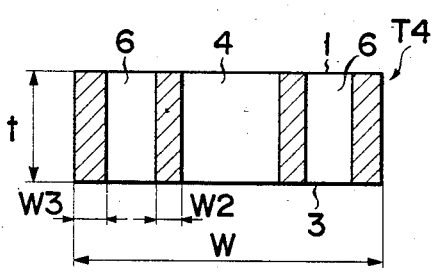

FIG. 14 is a top view showing a fourth embodiment of the present invention and FIG. 15 is a sectional view taken along a line A—A' in FIG. 14. This fourth embodiment of throw-away tip T4 is of square shape and has four through-holes 6, which define a partition wall 19 interposed between two adjacent through-holes 6 and formed between the noses 5 and the fixing through-hole 4. With this fourth embodiment, the strength along the resultant direction of feeding component force $F_f$ and back component force $F_p$ in cutting resistance F is reinforced. The fourth embodiment is therefore suitable for intermittent and heavy cuttings.

Figure 16:
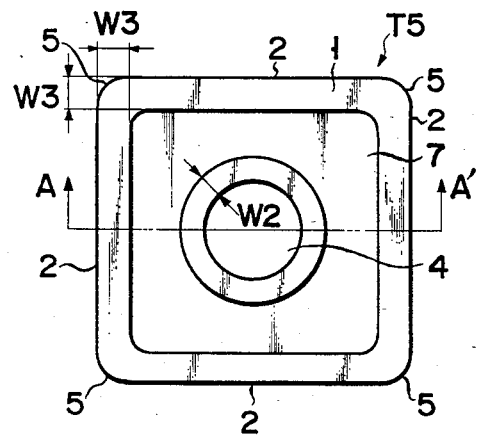
FIGS. 16 and 17 are top plan and sectional views showing a fifth embodiment of a cutting tool according to the present invention, respectively.
Figure 17:
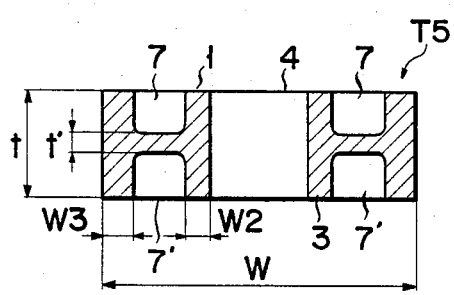

FIG. 16 is a top view showing a fifth embodiment of the present invention and FIG. 17 is a sectional view taken along a line A—A' in FIG. 16. This fifth embodiment of throw-away tip T5 is of square shape and has recesses 7 and 7' formed on rake and bottom faces 1 and 3, respectively, each of the recesses 7 and 7' having an outer peripheral face separated by a constant distance w3 from the cutting blade edge 2, and an inner circumferential face spearated by a constant distance w2 from the fixing through-hole 4. The recesses 7 and 7' on rake and bottom faces 1 and 3 are separated from each other by a bottom of thickness t'.

Figure 18:
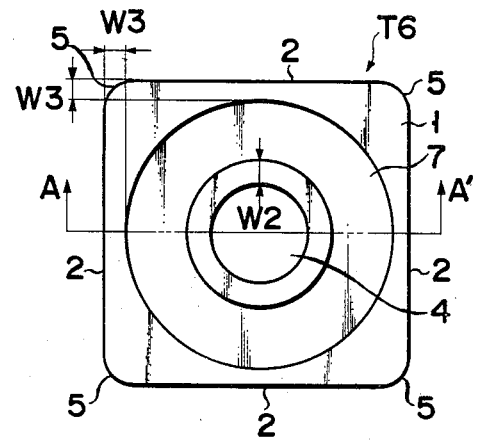
FIGS. 18 and 19 are top plan and sectional views showing a sixth embodiment of a cutting tool according to the present invention, respectively.
Figure 19:
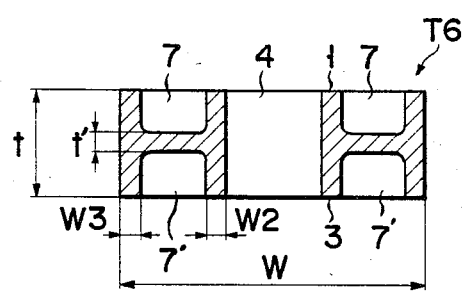

FIG. 18 is a top view showing a sixth embodiment of the present invention and FIG. 19 is a sectional view taken along a line A—A' in FIG. 18. This sixth embodiment of throw-away tip T6 is of square shape and has ring-shaped recesses 7 and 7' formed on the rake and bottom faces 1 and 3, respectively, outside the outer circumference of the fixing through-hole 4.

Figure 20:
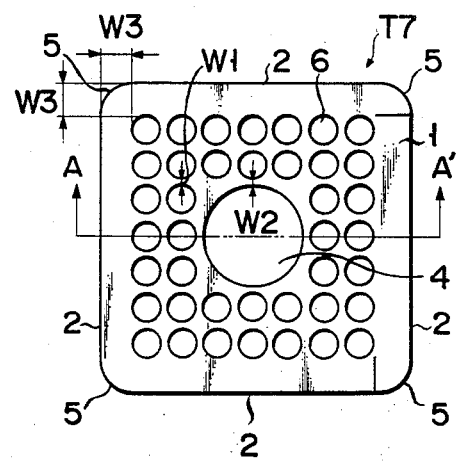
FIGS. 20 and 21 are top plan and sectional views showing a seventh embodiment of a cutting tool according to the present invention, respectively.
Figure 21:
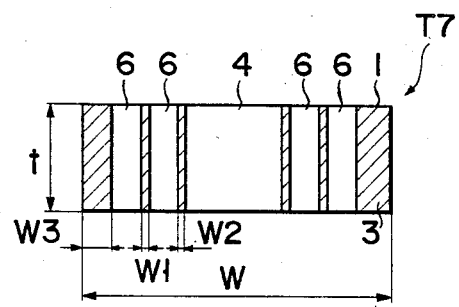

FIG. 20 is a top view showing a seventh embodiment of the present invention and FIG. 21 is a sectional view taken along a line A—A' in FIG. 20. This seventh embodiment of throw-away tip T7 is of square shape and has a multiple of cylindrical through-holes 6 to achieve higher radiating effect.

Figure 22:
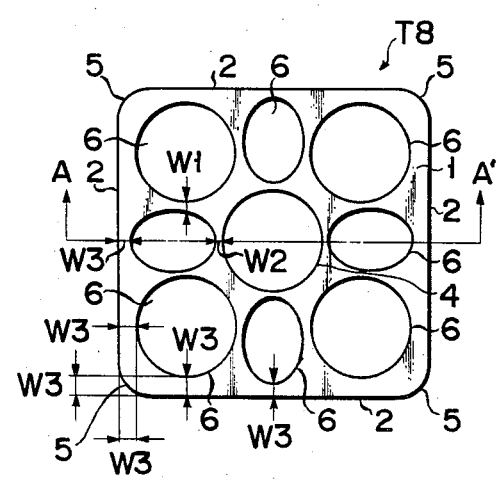
FIGS. 22 and 23 are top plan and sectional views showing an eighth embodiment of a cutting tool according to the present invention, respectively.
Figure 23:
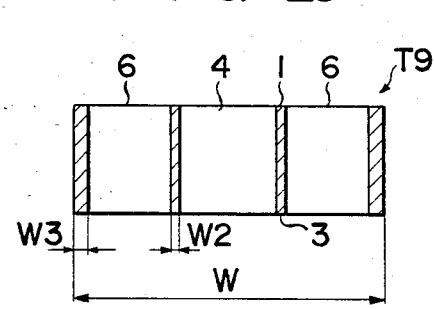

FIG. 22 is a top view showing an eighth embodiment of the present invention and FIG. 23 is a sectional view taken along a line A—A' in FIG. 22. This eighth embodiment of throw-away tip T8 is of square shape and provided with different elliptic through-holes 6.

Figure 24:
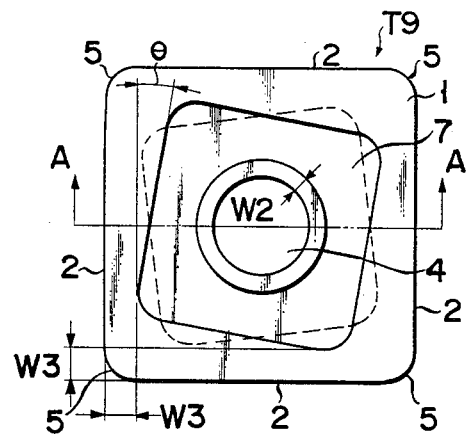
FIGS. 24 and 25 are top plan and sectional views showing a ninth embodiment of a cutting tool according to the present invention, respectively.
Figure 25:
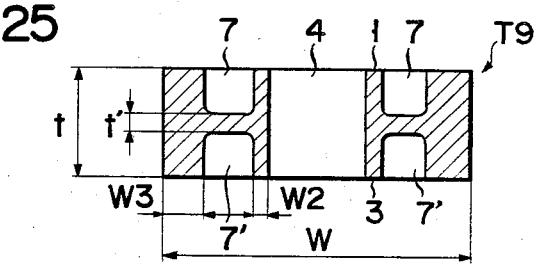

FIG. 24 is a top view showing a ninth embodiment of the present invention and FIG. 25 is a sectional view taken along a line A—A' in FIG. 24. This ninth embodiment of throw-away tip T9 is of square shape. Considering the direction in which feeding f is applied, the thorw-away tip T9 has the outer peripheral face of each of recesses 7 and 7' of the fifth embodiment slanted by an angle $\theta$ (5 through 30 degrees) relative to the cutting blade edge 2. Since thickness dimension of each of noses 5 is made larger by the angle $\theta$, the throw-away tip T9 can be used under more difficult cutting condition as compared with those having such recesses as shown in the case of fifth embodiment.

Figure 26:
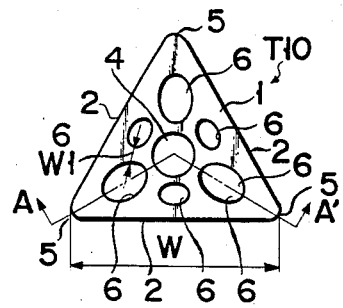
FIGS. 26 and 27 are top plan and sectional views showing a tenth embodiment of a cutting tool according to the present invention, respectively.
Figure 27:
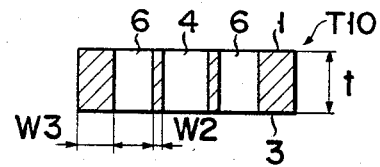

FIG. 26 is a top view showing a tenth embodiment of the present invention and FIG. 27 is a sectional view taken along a line A—A' in FIG. 26. This tenth embodiment of throw-away tip T10 is of triangular shape and has different elliptic through-holes 6.

Figure 28:
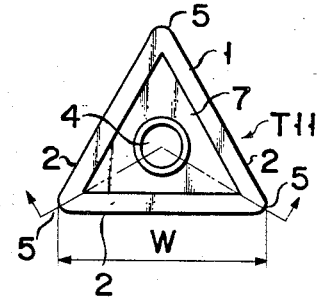
FIGS. 28 and 29 are top plan and sectional views showing an eleventh embodiment of a cutting tool according to the present invention, respectively.
Figure 29:
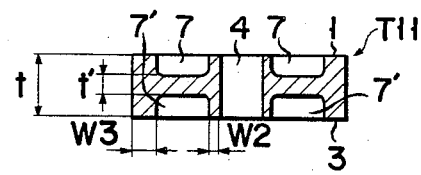

FIG. 28 is a top view showing an eleventh embodiment of the present invention and FIG. 29 is a sectional view taken along a line A—A' in FIG. 28. This eleventh embodiment of throw-away tip T11 is of triangular shape and has recesses 7 and 7' formed on the rake and bottom face 1 and 3, respectively, outside the fixing through-hole 4.

Figure 30:
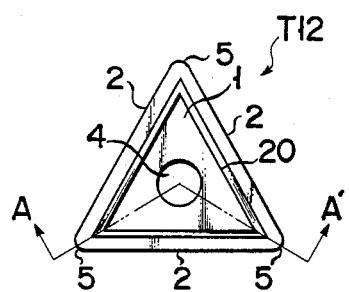
FIGS. 30 and 31 are top plan and sectional views showing a twelfth embodiment of a cutting tool according to the present invention, respectively.
Figure 31:
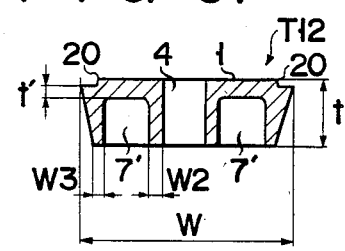

FIG. 30 is a top view showing a twelfth embodiment of the present invention and FIG. 31 is a sectional view taken along a line A—A' in FIG. 30. This twelfth embodiment of throw-away tip T12 is of triangular shape. The throw-away tip T12 has a recess 7' formed on the bottom face 3, and cutting blade edges 2 each being tapered. Numeral 20 denotes a chip breaker swelled from the rake face 1 and serving to cut the cut chip to pieces.

Figure 32:
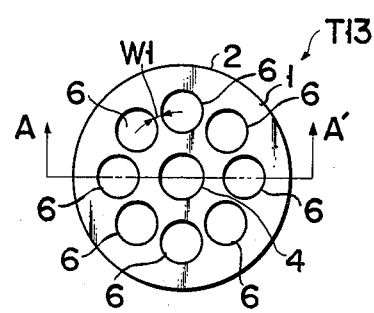
FIGS. 32 and 33 are top plan and sectional views showing a thirteenth embodiment of a cutting tool according to the present invention, respectively.
Figure 33:
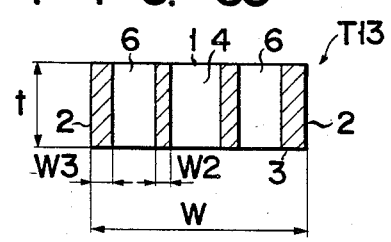

FIG. 32 is a top view showing a thirteenth embodiment of the present invention and FIG. 33 is a sectional view taken along a line A—A' in FIG. 32. This thirteenth embodiment of throw-away tip T13 is of circular shape and has a plurality of circular through-holes 6 formed around the fixing through-hole 4.

Figure 34:
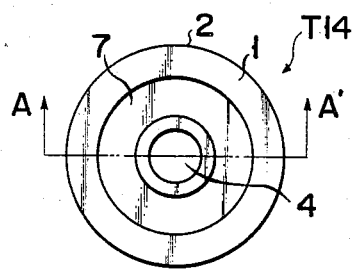
FIGS. 34 and 35 are top plan and sectional views showing a fourteenth embodiment of a cutting tool according to the present invention, respectively.
Figure 35:
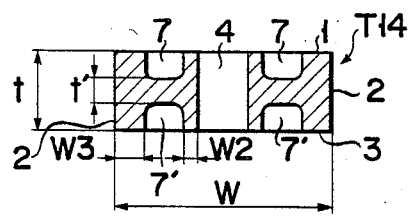

FIG. 34 is a top view showing a fourteenth embodiment of the present invention and FIG. 35 is a sectional view taken along a line A—A' in FIG. 34. This fourteenth embodiment of throw-away tip T14 is of circular shape and has ring-shaped recesses 7 and 7' formed on the rake and bottom faces 1 and 3, respectively, around the fixing through-hole 4.

Figure 36:
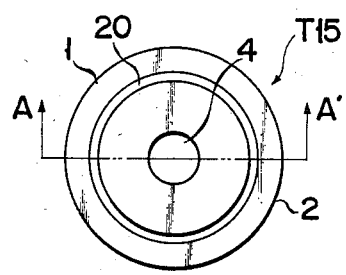
FIGS. 36 and 37 are top plan and sectional views showing a fifteenth embodiment of a cutting tool according to the present invention, respectively.
Figure 37:
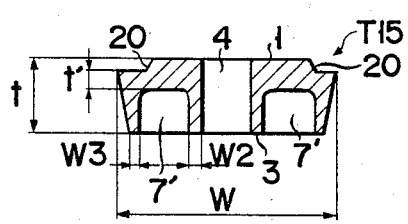

FIG. 36 is a top view showing a fifteenth embodiment of the present invention and FIG. 37 is a sectional view taken along a line A—A' in FIG. 36. This fifteenth embodiment of throw-away tip T15 is of circular shape and provided with a tapered cutting blade edge 2 and a ring-shaped recess 7' formed on the bottom face around the fixing through-hole 4. Numeral 20 represents a chip breaker formed on the rake face.

Figure 38:
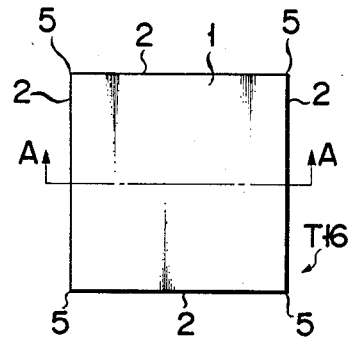
FIGS. 38, 39 and 40 are top, bottom and sectional views showing a sixteenth embodiment of a cutting tool according to the present invention, respectively.
Figure 39:
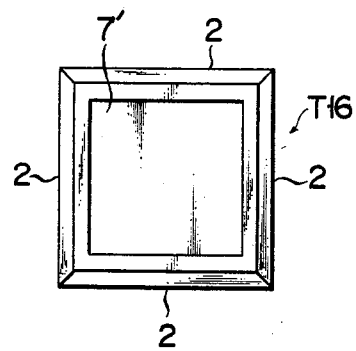
Figure 40:
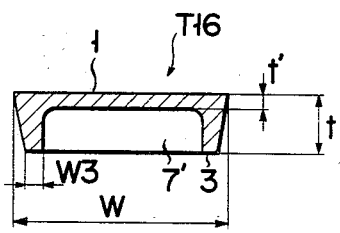

FIG. 38 is a top view showing a sixteenth embodiment of the present invention and FIG. 39 is a bottom view thereof and FIG. 40 is a sectional view taken along a line A—A' in FIG. 38. This sixteenth embodiment of throw-away tip T16 is of square shape and has no fixing through-hole 4. The throw-away tip T16 is not attached to the bit 10 by means of clamping pin 17 but fixed to the bit 10 by means of a metal fitting with its rake face 1 pressed onto the cutting tool 10. Each of cutting blade edges 2 is tapered and a recess 7' is formed on the bottom face 3.

Figure 41:
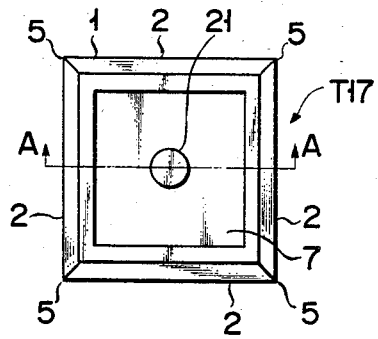
FIGS. 41 and 42 are top plan and sectional views showing a seventeenth embodiment of a cutting tool according to the present invention, respectively.
Figure 42:
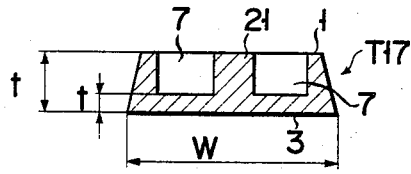

FIG. 41 is a top view showing a seventeenth embodiment of the present invention and FIG. 42 is a sectional view taken along a line A—A' in FIG. 41. This seventeenth embodiment of throw-away tip T17 is of square shape and has no fixing through-hole 4. Each of cutting blade edges 2 is tapered and the rake face 1 is provided with a recess 7' and a column-like projection 21. The column-like projection 21 is arranged in the center of the recess 7' and serving to support load applied when the throw-away tip T17 is fixed to the cutting tool 10.

FIG. 43 is a top view showing an eighteenth embodiment of the present invention, and FIG. 44 is a bottom view thereof and FIG. 45 is a sectional view taken along a line A—A' in FIG. 43. This eighteenth embodiment of throw-away tip T18 is of triangular shape and has no fixing through-hole 4. Each of cutting blade edges 2 is tapered and a recess 7' is formed on the bottom face 3.

FIG. 46 is a top view showing a nineteenth embodiment of the present invention and FIG. 47 is a sectional view taken along a line A—A' in FIG. 46. This nineteenth embodiment of throw-away tip T19 is of triangular shape and has no fixing through-hole 4. Each of cutting blade edges 2 is tapered and a recess 7 is formed on the rake face 1 with a column-like projection 21 formed in the center thereof.

FIG. 48 is a top view showing a twentieth embodiment of the present invention and FIG. 49 is a bottom view thereof and FIG. 50 is a sectional view taken along a line A—A' in FIG. 48. This twentieth embodiment of throw-away tip T20 is of circular shape and has no fixing through-hole 4. The cutting blade edge 2 is tapered and a recess 7' is formed on the bottom face 3.

FIG. 51 is a top view showing a twenty-first embodiment of the present invention and FIG. 52 is a sectional view taken along a line A—A' in FIG. 51. This twenty-first embodiment of throw-away tip T21 is of circular shape and has no fixing through-hole 4. The cutting blade edge 2 is tapered and a recess 7 is formed on the rake face 1 with a column-like projection 21 projected in the center thereof.

In addition to the various embodiments of the present invention as described above, the throw-away tip may be arranged so that either or both of through-holes 6 and recesses 7, 7' are formed on the rake and bottom faces 1 and 3, respectively. The throw-away tip having no fixing through-hole 4 may be prvided with through-holes 6 and recesses 7, 7', similar to the one having fixing through-hole 4. The through-holes 6 and recesses 7, 7' may be tapered so as to be easily removed from the die. When the chip breaker 20 is provided, a member for forming the chip breaker 20 may be fixed on the rake face 1 of the throw-away tip or the rake face 1 may be processed to form a stepped portion. Although the above-described embodiments of the present invention have been related to the throw-away tip which forms the blade of the cutting tool 10, it should be understood that the present invention can be applied to those throw-away tips which are employed by all kinds of cutting tools such as in drilling, boring and milling.

According to the throw-away tips of the present invention as described above, the rake and bottom faces, which do not participate in cutting directly, are provided with the through-holes and recesses. Therefore, rare and expensive cutter material can be saved, and the throw-away tip can be prevented from being damaged by cutting heat because its radiating area is made larger.

What is claimed is:

1. A method of reducing the amount of super hard material used in making a throw-away tip made from a given type of super hard material without running the risk of catastrophic failure, the throw-away tip:
   (a) having a rake face, an attaching face parallel to the rake face, at least one cutting blade edge, and a central axis perpendicular to the rake and attaching faces;
   (b) having given exterior dimensions; and
   (c) being designed for use in cutting a work piece rotating at a given rotational speed and made from a given type of material at a given maximum feed rate of f distance units per revolution of the work piece, said method comprising the steps of:
   (d) providing a plurality of cavities in at least one of the rake and attaching faces of the throw-away tip, none of said plurality of cavities being a mounting throughhole, each of said plurality of cavities being at least partially defined by a first side surface which is the side surface of each of said plurality of cavities closest to the nearest cutting blade edge and a second side surface which is the side surface of each of said plurality of cavities closest to the nearest adjacent one of said plurality of cavities, each one of said plurality of cavities extending at least a major portion of the distance between the rake and attaching faces and a major portion of the distance between the nearest cutting blade edge and the central axis of the throw-away tip and at least one of said plurality of cavities being a through-hole penetrating from the rake face to the attaching face, whereby said plurality of cavities replace a substantial amount of the super hard material;
   (e) selecting a minimum distance $w_3$ between said first side surface of each of said plurality of cavities and the nearest cutting blade edge which falls within the range $f \leq w_3 \leq 5f$; and
   (f) selecting a minimum distance $w_1$ between said second side surfaces of adjacent ones of said plurality of cavities which falls within the range $f \leq w_1 \leq 5d$.

2. A method according to claim 1 wherein at least one of said plurality of cavities is formed on the rake face.

3. A method according to claim 1 wherein at least one of said plurality of cavities is formed on the attaching face.

4. A method according to claim 1 wherein at least one of said plurality of cavities is formed on each of the rake and attaching faces.

5. A method according to claim 2, 3 or 4 wherein at least one of said plurality of cavities is a recess.

6. A method according to claim 4 wherein:
 (a) a plurality of recesses are formed in each of the rake and the attaching faces;
 (b) said recesses in the rake face are formed coaxial to those in the attaching face; and
 (c) a minimum distance t between each pair of coaxial recesses in the rake and attaching faces falls within the range $f \leq t \leq 5f$.

7. A method to claim 1 wherein a plurality of said plurality of cavities are through-holes penetrating from the rake face to the attaching face.

8. A method according to claim 4 wherein:
 (a) a plurality of recesses are formed in each of the rake and the attaching face and
 (b) said recesses and the rake face are formed coaxial to and communicated with corresponding recesses in the attaching face.

9. A cutting tool for cutting a workpiece by a relative rotation between the cutting tool and the workpiece, comprising:
 a bit holder;
 a throw-away tip made of super-hard material, said throw-away tip having a rake face, an attaching face parallel to the rake face, and at least one cutting blade edge;
 means for attaching said throw-away tip to said bit holder; and
 drive means for causing relative movement between said bit holder and said workpiece in a feeding direction by a prescribed relative rate f per revolution,
 said throw-away tip including at least one cavity on at least one of the rake and attaching faces, said at least one cavity extending a major portion of the distance between the rake and attaching faces and a major portion of the distance between the nearest cutting blade edge and the central axis of the throw-away tip, whereby said at least one cavity replaces a substantial amount of the super hard material, said at least one cavity being at least partially defined by a first side surface which is the side surface of said at least one cavity closest to the nearest cutting blade edge, and wherein a minimum distance w3 between said first side surface of said at least one cavity and the nearest cutting blade edge falls within the range;

$$f_{max} \leq w_3 \leq 5f_{max}.$$

where $f_{max}$ is a maximum value of f.

10. A cutting tool according to claim 9, wherein said at least one cavity is formed on each of the rake and attaching faces.

11. A cutting tool according to claim 10, wherein said at least one cavity is a recess.

12. A cutting tool according to claim 10, wherein
 (a) a plurality of cavities are formed in said throw-away tip, each of said cavities being at least partially defined by a second side surface which is the side surface of the cavity closest to the nearest adjacent one of said cavities, and
 (b) a minimum distance $w_1$ is provided between said second side surfaces of adjacent ones of said plurality of cavities, the distance $w_1$ falls within the range;

$$f_{max} \leq w_1 \leq 5f_{max}.$$

13. A cutting tool according to claim 10, wherein
 (a) said at least one cavity formed in each of the rake and attaching faces includes a plurality of recesses,
 (b) said recesses in the rake face are formed coaxial to those in the attaching face, and
 (c) a minimum distance t' between each pair of coaxial recesses in the rake and attaching faces falls within the range;

$$f_{max} \leq t' \leq 5f_{max}.$$

14. A cutting tool according to claim 9, wherein at least one cavity is a through-hole penetrating from the rake face to the attaching face.

15. A cutting tool according to claim 12, wherein said plurality of cavities are through-holes penetrating from the rake face to the attaching face.

16. A cutting tool according to claim 10, wherein
 (a) said at least one cavity formed in each of the rake and attaching faces includes a plurality of recesses, and
 (b) said recesses in the rake face are formed coaxial to and communicated with corresponding recesses in the attaching face.

17. A method of making a throw-away tip for use as a component of a cutting tool for cutting a workpiece comprising:
 a bit holder;
 first means for causing relative rotation between the cutting tool and the workpiece;
 second means for causing relative movement between the cutting tool and the workpiece,
 a throw-away tip made of super hard material, said throw-away tip having a rake face, and attaching face parallel to the rake face, and at least one cutting blade edge; and
 third means for attaching said throw-away tip to said bit-holder,
 said method being adapted to susbtantially reduce the amount of the super hard material comprising the throw-away tip having given exterior dimensions and designed for use on a given type of the workpiece and at a given feed rate of $f_{max}$ distance units per revolution without running the risk of catastrophic failure of the throw-away tip, said method comprising the steps of:
 providing at least one cavity on at least one of the rake and attaching faces of the throw-away tip, said at least one cavity extending a major portion of the distance between the rake and attaching faces and a major portion of the distance between the nearest cutting blade edge and the central axis of the throw-away tip, whereby said at least one cavity replaces a substantial amount of the super hard material, said at least one cavity being at least partially defined by a first side surface which is the side surface of said at least one cavity closest to the nearest cutting blade edge, and selecting a minimum distance $w_3$ between said first side surface of said at least one cavity and the nearest cutting blade edge which falls within the range $$f_{max} \leq w_3 \leq 5f_{max}.$$

18. A method according to claim 17, wherein said at least one cavity formed on each of the rake and attaching faces.

19. A method according to claim 18, wherein said at least one cavity is a recess.

20. A method according to claim 18, wherein
    (a) a plurality of cavities are formed in said throw-away tip, each of said cavities being at least partially defined by a second side surface which is the side surface of the cavity closest to the nearest adjacent one of said cavities, and
    (b) a minimum distance $w_1$ is provided between said second side surfaces of adjacent ones of said plurality of cavities, the distance $w_1$ falls within the range;

$$f_{max} \leq w_1 \leq 5f_{max}.$$

21. A method according to claim 18, wherein
    (a) said at least one cavity formed in each of the rake and attaching faces includes a plurality of recesses,
    (b) said recesses in the rake face are formed coaxial to those in the attaching face, and
    (c) a minimum distance $t'$ between each pair of coaxial recesses in the rake and attaching faces falls within the range;

$$f_{max} \leq t' \leq 5f_{max}.$$

22. A method according to claim 17, wherein at least one cavity is a through-hole penetrating from the rake face to the attaching face.

23. A method according to claim 20, wherein said plurality of cavities are through-holes penetrating from the rake face to the attaching face.

24. A method according to claim 18, wherein
    (a) said at least one cavity formed in each of the rake and attaching faces includes a plurality of recesses, and
    (b) said recesses in the rake face are formed coaxial to and communicated with corresponding recesses in the attaching face.

25. A method for cutting a workpiece by using a cutting tool which comprises:
    a bit holder;
    a throw-away tip made of super hard material, said throw-away tip having a rake face, an attaching face parallel to the rake face, and at least one cutting blade edge; and
    means for attaching the throw-away tip to said bit holder, said method comprising steps of:
    setting the throw-away tip to the bit holder by means of said attaching means;
    causing a relative rotation between the cutting tool and workpiece; and
    causing a relative movement between the cutting tool and the workpiece in a feeding direction by a prescribed feed rate f per revolution,
    said throw-away tip including at least one cavity on at least one of the rake and attaching faces, said at least one cavity extending a major portion of the distance between the rake and attaching faces and a major portion of the distance between the nearest cutting blade edge and the central axis of the throw-away tip, whereby said at least one cavity replaces a substantial amount of the super hard material, said at least one cavity being at least partially defined by a first side surface which is the side surface of said at least one cavity closest to the nearest cutting blade edge, and wherein a minimum distance $w_3$ between the first side surface of said at least one cavity and the nearest cutting blade edge falls within the range;

$$f_{max} \leq w_3 \leq 5f_{max}.$$

where $f_{max}$ is a maximum value of f.

26. A method according to claim 25, wherein said at least one cavity formed on each of the rake and attaching faces.

27. A method according to claim 26, wherein said at least one cavity is a recess.

28. A method according to claim 26, wherein
    (a) a plurality of cavities are formed in said throw-away tip, each of said cavities being at least partially defined by a second side surface which is the side surface of the cavity closest to the nearest adjacent one of said cavities, and
    (b) a minimum distance $w_1$ is provided between said second side surfaces of adjacent ones of said plurality of cavities, the distance $w_1$ falls within the range;

$$f_{max} \leq w_1 \leq 5f_{max}.$$

29. A method according to claim 26, wherein
    (a) said at least one cavity formed in each of the rake and attaching faces includes a plurality of resesses,
    (b) said recesses in the rake face are formed coaxial to those in the attaching face, and
    (c) a minimum distance $t'$ between each pair of coaxial recesses in the rake and attaching faces falls within the range;

$$f_{max} \leq t' \leq 5f_{max}.$$

30. A method according to claim 25, wherein at least one cavity is a through-hole penetrating from the rake face to the attaching face.

31. A method according to claim 28, wherein said plurality of cavities are through-holes penetrating from the rake face to the attaching face.

32. A method according to claim 26, wherein
    (a) said at least one cavity formed in each of the rake and attaching faces includes a plurality of recesses, and
    (b) said recesses in the rake face are formed coaxial to and communicated with corresponding recesses in the attaching face.

* * * * *